United States Patent Office 2,826,318
Patented Mar. 11, 1958

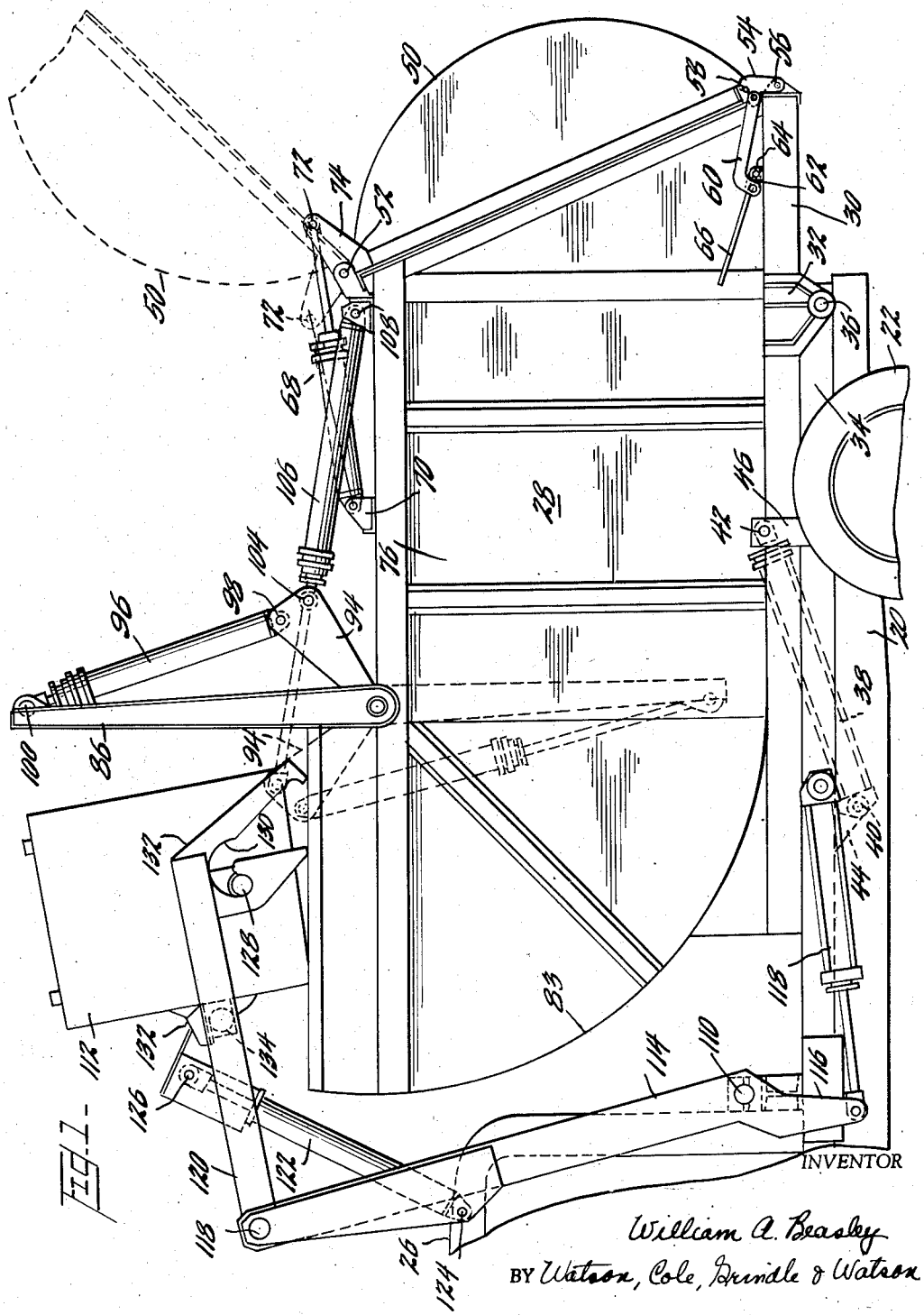

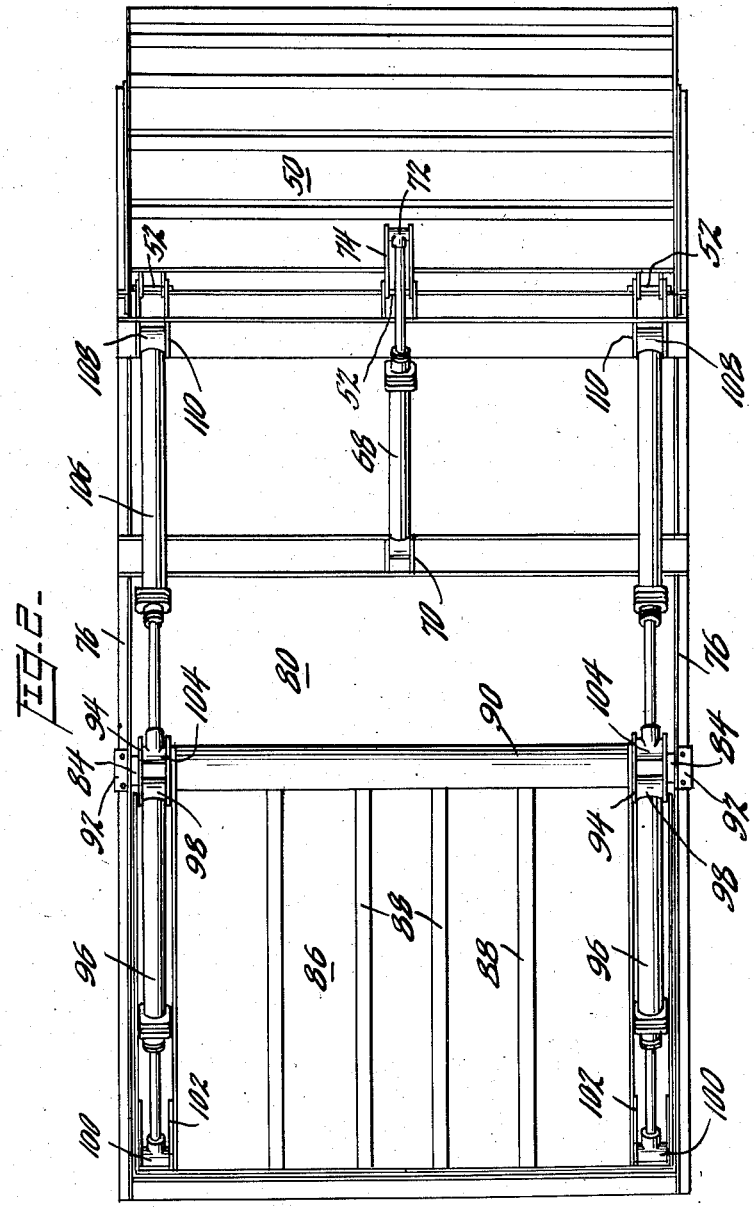

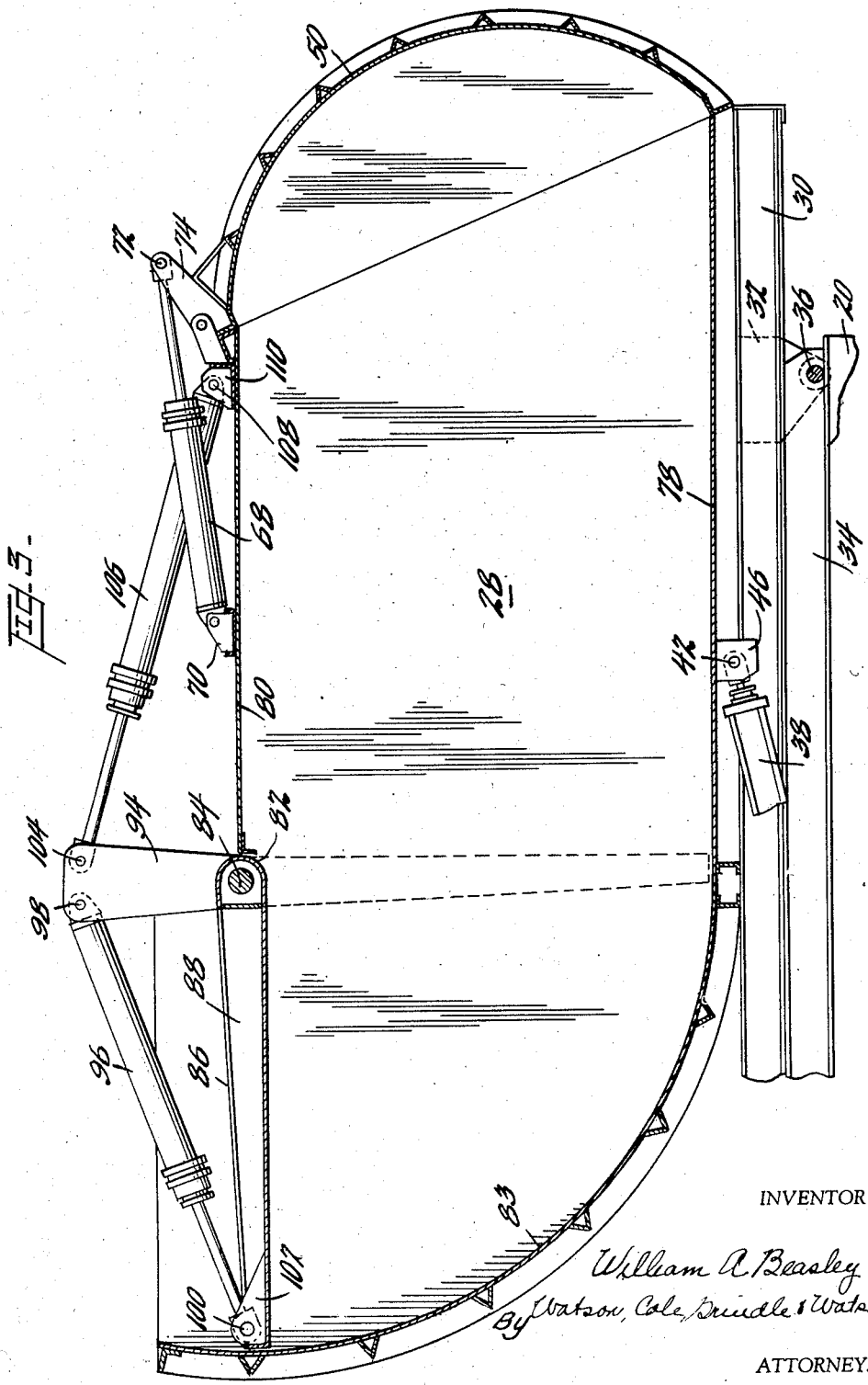

2,826,318

HYDRAULIC PACKER BODY

William A. Beasley, Daisy, Tenn., assignor to Ernest Holmes Company, Chattanooga, Tenn., a corporation of Tennessee Application April 18, 1956, Serial No. 579,081

15 Claims. (Cl. 214—83.3)

This invention relates to improvements in load compacting and discharging mechanism particularly adapted for use in connection with refuse collection trucks or vehicles, though by no means limited to such use. It is a primary object of the invention to provide a hydraulically actuated load compacting and discharging body for a truck in which the body is filled at the front end and successive charges of material delivered into the front end are successively compacted downwardly and rearwardly, while at the same time being urged toward the rear end of the body. In particular, the invention has to do with the application to the load-carrying body of a swingably mounted packer element arranged to perform the multiple functions of compressing the contents of the truck body and urging it toward the rear discharge end of the body and of acting as a closure for the charging opening in the truck body.

In accordance with the invention, the swingable packer or packer element is hinged at or adjacent the rear edge of the charging opening of the body for swinging movement downwardly and rearwardly into the body toward its discharge end. Also in order to prevent accumulation of material in the lower forward corner of the body, there may be provided an accurate chute curved downwardly and rearwardly from the forward edge of the charging opening and merging with the generally horizontal bottom of the body.

The invention further contemplates the use with such a body of a front loader of the type which picks up a container of refuse material from in front of the truck, lifts it up over the truck cab and then empties it in a generally rearwardly and downwardly direction through the charging opening of the body. The packer element of the present invention is adapted to cooperate with such a loader to direct the incoming material downwardly into the charging opening and prevent it from passing over such opening to lie on top of the truck body. To this end the packer element is adapted to be swung upwardly to a substantially vertical position at the rear edge of the charging opening to leave such opening unobstructed and to thus intercept any material which may be thrown rearwardly across the charging opening.

A further novel aspect of the invention consists in utilizing such a packer element in a more or less conventional type dump truck body, the arrangement being such that in the rearwardly inclined dumping position of the body the packer element is operative to initiate discharge of the body contents.

A further important aspect of the invention consists in the utilization of hydraulic actuating means directly connected between the packer element and the said body for movement with the packer element into the charging opening and arranged in a novel manner to swing around and clear the rear edge of the charging opening. Such arrangement of the actuating mechanism for the packer element obviously results in a simplified economical construction.

In the accompanying drawings:

Figure 1 is a side elevation of a preferred embodiment of the invention as applied to a truck (shown fragmentarily) having a conventional front loading mechanism;

Figure 2 is a plan view of the packer body removed from the truck; and

Figure 3 is a vertical longitudinal cross section through the packer body of Figure 2, but including portions of the supporting truck chassis and dumping mechanism.

Referring now in detail to the drawings, the invention is illustrated in Figure 1 as applied to a motor truck (shown fragmentarily) of generally conventional construction, comprising the main frame or chassis 20 supported on front and rear wheels of which only rear wheel 22 is shown, and controlled by a driver housed in the cab 26 at the forward end of the truck. The truck body in this instance designated 28 comprises a rigid under frame 30 on opposite sides of which depend brackets 32 by means of which the rear end portion of the body 28 in its entirety is pivotally connected to the truck bed 34 for tilting movement about the transverse horizontal axis defined by shaft 36. Such tilting movement is produced in usual manner by a hydraulic cylinder and piston unit 38, the opposite ends of which are pivotally connected at 40 and 42, respectively, to a bracket 44 fixed on the truck bed and bracket 46 fixed to the under frame 30. The arrangement is such that when actuating fluid is introduced into the cylinder and piston unit 38 to extend it this results in swinging the body 28 with its under frame 30 upwardly about the transverse axis 36 to a rearwardly tilted position in which the contents of the body 28 will be urged by gravity to move toward the rear discharge end of the body. In this connection it will be noted that the rearwardly opening discharge end of the body is normally maintained closed by an end gate 50 which is swingably mounted at 52 so that it may be swung upwardly to open position to permit discharge of the body contents. End gate 50 will normally be retained in closed position by means such as the latch 54 pivotally mounted at 56 for movement to and from operative engagement with laterally projecting detents 58 on opposite sides of the end gate 50 adjacent its lower end. Such a latch 54 may be maintained in operative position as shown by means of a link 60 connecting it to a crank arm 62 pivotally mounted on the body 28 at 64 and controlled by an operating lever or handle 66. When swung to the over center position as shown, the arm 62 will obviously act through link 60 to secure the latch 54 in operative position. The latch may obviously be released by swinging the lever 66 in a clockwise direction.

For the purpose of swinging the end gate 50 to a raised open position, there may be provided an extensible hydraulic cylinder and piston unit 68. Such unit 68 is pivoted at one end to a bracket 70 on the top of body 28 and at the other end is pivoted at 72 to a crank arm 74 fixed on the end gate 50 in a generally radial position to the axis 52, about which the end gate swings. The cylinder and piston unit 68 may be extended and contracted in conventional manner.

It will be seen that the body 28 has its major axis extending in a fore and aft direction and is completely enclosed by the opposed sides 76, bottom 78 and top wall 80 except as to the discharge opening at its rear end and the charging opening 82 which opens upwardly through its forward end.

Swingably mounted about a transverse axis, as defined by the shaft 84 at the rear edge of the charging opening 82, is a packer or packer element 86 which conforms in size and shape to the charging opening 82 and is swingable for approximately 180° between vertical positions above and below the axis 84. The packer 86, which is of rigid metal construction, preferably reinforced by the longitudinal angle iron braces 88 is provided with a generally sleeve-like journal portion 90 which receives the shaft 84 and the ends of this shaft are journaled in bearings 92, respectively supported on the opposite sides of the body 28. It will be noted that the sleeve 90 terminates in spaced relation to the respective bearings 92, and journaled on the shaft 84 in the spaces between the sleeve 90 and bearings 92 are the inner ends of swingable arms 94 respectively, which constitute portions of the actuating linkage or mechanism for the packer 86. Such actuating mechanism is preferably duplicated on each side of the wagon body and each such mechanism includes one of the arms 94 and a double-acting extensible and contractible hydraulic or fluid actuated cylinder and piston unit 96, having one end pivotally connected to arm 94 as at 98 and its opposite end pivotally connected at 100 to a clevis 102 fixed adjacent the radially outer edge of the packer 86. Also pivotally connected to the arm 94 at 104 and preferably in circumferentially spaced relation to the pivotal connection 98 is a further double-acting hydraulic or other fluid pressure actuated cylinder and piston unit 106. The opposite end of the unit 106 is pivotally connected at 108 to a bracket 110 fixed on the truck body 28. As above mentioned, the actuating mechanism consisting of the arm 94 and the fluid actuating units 96 and 106, is duplicated on opposite sides of the packer element 86 and suitable means is provided for simultaneously actuating the two hydraulic units 96 and 106 of each said actuating mechanism either to extend or to retract them and to maintain them at rest in either extended or retracted positions or intermediate positions.

With such arrangement, it will be seen that the packing element 86 may be swung from its upwardly projecting position, as shown in full lines in Figure 1, through a range of approximately 180° into the charging opening 82 and downwardly and rearwardly to the vertically depending position designated by the broken line showing in Figure 1. During such upward and rearward movement, after entering the charging opening 82, it will, of course, function to exert a downward and rearward pressure against any material in the forward end of the body 28, to consolidate such material and to urge it rearwardly toward the discharge end of the body 28. Needless to say, the packer element 86 will function to compress the contents of the body 28 against the end gate 50, thereby increasing the overall capacity of the body 28.

While the body 28 may be loaded manually through the charging opening 82 or by any suitable mechanism, said body and its packing element 86 may be particularly advantageously employed in combination with a more or less conventional front loader of the type which is adapted to pick up material from the ground level in front of the truck and swing same upwardly and rearwardly over the truck cab 26 and thereafter discharge the material in a generally downwardly and rearwardly direction over the charging opening 82 and to some extent toward the upwardly swung packer element 86. In such combination the packer element 86, when in its upwardly swung open position, as shown in Figure 1, functions as a backstop or deflector for intercepting any of the material which may pass completely across the charging opening 82. Such material, after impacting against the packer element 86 will, of course, be carried by same into the charging opening 82. Thus, by preventing refuse material from coming to rest on the top or cover 80 of the body 28, the sanitary usage of same will be increased.

The particular form of loading mechanism shown in Figure 1 is of a presently commercially available type, such as is generally disclosed in my pending application Serial No. 490,848. Such a loading mechanism, generally speaking, comprises a pair of opposed articulated arm structures each hingedly supported at 110 by suitable structure on the truck bed 34 for vertical swinging movement on opposite sides of cab 26. Each such articulated arm structure comprises an inner arm 114 which is hinged at 110 as above mentioned and which has a crank arm extension 116 adapted for actuation by a hydraulic piston and cylinder unit 118 which is connected in usual manner between the arm 116 and the truck bed 34. Each such unit 118 is of a conventional double-acting type supplied with actuating fluid and controlled in conventional manner, the arrangement being such that extension of the element 118 will produce upward swinging of the inner arm sections 114 and contracting of these units or elements 118 will result in downward swinging of the inner arm sections 114. Carried by and pivotally connected to the outer ends of the arm sections 114 at 118 are rigid outer arm sections 120 which are adapted to support between them at their outer ends a suitable refuse container 112. Each outer arm 120 is swingable relative to its inner arm section 114 about the pivot 118 by means of a fluid pressure actuated cylinder and piston unit 122 extending between and having its extremities pivotally connected at 124 and 126 to the respective arm sections 114 and 120 at locations eccentric to the pivotal connection 118. The fluid pressure actuated units 122, as well as the units 118 are of a conventional double-acting type and are controllable by conventional means which is so well-known as not to require illustration.

In the particular embodiment of loading mechanism illustrated the refuse container 112 is of a type which is adapted to be detachably supported at the outer ends of the arm sections 120. To this end the container 112 is provided adjacent its upper end without substantially laterally projected trunnions 128 adapted for reception in laterally opposed sockets 130 defined by brackets 132 at the outer ends of the respective outer arm sections 120. The arm structures may be actuated to raise the container 112 upwardly over the cab 26 and thence downwardly and rearwardly toward the charging opening 82 in body 28.

In order to cause inversion of the container 112 during its rearwardly and downwardly swinging movement, such container is provided with an abutment element 132 which is adapted to engage a cross bar or shaft 134 extending between and interconnecting the outer arm sections 120. Engagement between these elements 132 and 134 will, of course, cause the container 112 to swing and be inverted with the arm sections 120.

During such actuation of the loading mechanism, or prior thereto, the hydraulic means 96 and 106 will have been actuated to retract the packer element 86 to the upwardly swung position illustrated in Figure 1, to thus open the charging opening 82 and direct any rearwardly moving refuse material from the container 112 downwardly into such opening. After the loading mechanism has been maneuvered to thus empty the container 112, the loading mechanism is then actuated in suitable manner to remove it from above the opening 82 and lower the container 112 to the ground. After the container 112 has been removed from above the opening 82, the hydraulic cylinders 96 and 106 may be actuated in usual manner to swing the packer element 86 downwardly into the charging opening 82 into engagement with the contents thereof and substantially through 180° to the vertically depending position shown in broken lines in Figure 1. After the packer element 86 has engaged the material, its movement downwardly and rearwardly will serve to compress or consolidate the material and at the same time urge it rearwardly through the body 28 toward the discharge end thereof. It will be apparent that successive changes of material delivered into the charging opening 82 and thus compressed and urged rearwardly will eventually fill the body 28 and extend back as far as the end gate 50, following which the loading and compressing of subsequent changes of material into the body 28 will cause the entire contents of the body to be compressed rearwardly against the end gate 50, thereby increasing the overall capacity of the body 28.

After the body 28 has been thus loaded to capacity, the truck may be driven to a suitable discharge point and the dump body 28 there tilted rearwardly about the pivot 36 by suitable actuation of the hydraulic unit 38, the end gate being released by suitable actuation of the latch control lever 66 and swung upwardly to open position through actuation of the hydraulic unit 68.

In the event the refuse or other material has been packed into the body 28 sufficiently so that the action of gravity will not at this time break its frictional grip on the interior surface of the body 28, the packer element 86 may be swung downwardly and rearwardly into engagement with the contents to initiate its rearward discharge movement, following which gravity may be relied upon to substantially complete the discharge of the contents.

It will be noted that during transportation of garbage or other refuse in the truck and in between the loading of successive charges into the charging opening 82, the packer element 86 may be positioned within the opening 82 as shown in Figure 3 to function as a closure, preventing the escape of objectionable odors and otherwise promoting the sanitary usage of the refuse collection vehicle.

In order to prevent accumulation of refuse material in the lower forward corner of the body 28, it is desirable to provide a chute 83 of arcuate conformation concentric to the axis of the swinging movement 84 of the packer element 86. This arcuate chute 83 is so disposed that its upper edge is coincident with and, in fact, constitutes the forward edge of the charging opening 82 and thence extends generally downwardly and rearwardly, preferably merging rearwardly with the horizontal bottom or floor 78 of the body 28. As is clearly illustrated, this chute 83 has its entire surface positioned substantially contiguously to the surface of revolution generated by the radially outer edge of the packer element 86 during its swinging movement. Thus, the packer element 86 moves in sweeping relation over the arcuate chute 83 to urge material downwardly and rearwardly therealong.

In this application, there is shown and described only the preferred embodiment of the invention simply by way of illustration of the best mode contemplated by me for carrying the invention into practice. However, the invention is obviously capable of other embodiments and it is recognized that its several details may be modified in various ways, all without departing from the invention. Accordingly, the drawings and description herein are are to be construed as merely illustrative in nature and not as exclusive.

Having thus described the invention, I claim:

1. A fore and aft extending enclosed load carrying body having an upwardly presented charging opening adjacent its forward end, and a discharge opening at its rear end, an end gate normally closing said disharge opening, a packer swingably mounted about a horizontal axis at the rear edge of said charging opening and swingable on its operative stroke downwardly through said opening and rearwardly toward said end gate to urge the contents of the body toward and compress same against said end gate, said body comprising a floor merging with and extending rearwardly from the rear end of said arcuate chute bottom.

2. A receptacle having an infeed chute opening horizontally into one end thereof and a normally closed discharge opening in the other end thereof, said chute being curved arcuately upwardly from said one of the receptacle and terminating in an upwardly presented normally open end defining a charging opening, a packer element swingably mounted on said receptacle for movement through said chute about an axis coincident with the center of curvature of said chute, and means for normally supporting said packer element as a closure in said charging opening, said means being operative selectively to withdraw the element upwardly from said opening to permit charging of materials therein, and to urge said element into and through said chute to pack said materials into said receptacle.

3. A fore and aft extending generally tubular load-carrying body having a discharge opening at the rear end thereof, a vertically arcuately curved infeed chute communicating horizontally with the forward end of said body, and having an upwardly directed charging opening, a packer element mounted for vertical swinging movement through said chute about the center of curvature thereof, means normally positioning said packer element as a closure in said chute, and means for retracting said element from the chute to permit charging of materials thereinto, and for thereafter swinging it downwardly and rearwardly through said chute to urge the materials therethrough toward said discharge opening.

4. Material feeding and compressing mechanism comprising a generally quadrant shaped arcuate chute, having an upwardly directed charging opening, and a horizontally directed discharge opening adapted for communication with a receptacle, a packer element mounted for swinging movement through said chute about an axis coincident with the center of curvature of said chute, and means normally supporting said packer element in said charging opening to function as a closure therefor, said means being operative selectively to withdraw the element upwardly from said charging opening to permit charging of materials thereinto, and to urge said element into and through said chute to pack said materials into said receptacle.

5. A fore and aft extending hollow load carrying body formed with an upwardly directed charging opening adjacent its forward end, and a rearwardly directed discharge opening, an infeed chute having an arcuate bottom curved downwardly and rearwardly from the forward edge of said charging opening about an axis of curvature adjacent the rear edge of said opening, and a packer element mounted for swinging movement through the chute about said axis, said element having an edge at its free end extending parallel to the axis of curvature of said chute and in contiguous relation to said chute.

6. The combination of claim 1, including means for swinging said packer element, said means comprising an arm element swingable about the said axis, an extensible and contractible double-acting hydraulic unit operatively connected between said arm element and said packer element at points respectively spaced from said axis to transmit a circumferential force between said points, and an extensible and contractible double-acting hydraulic unit similarly operatively connected between said arm element and said body.

7. The combination of claim 6, including hydraulic means for simultaneously extending and retracting the said hydraulic units.

8. The combination of claim 5, including means operative through said charging opening for swinging said packing element through said chute.

9. A receptacle having an infeed chute opening horizontally into one end thereof and formed with a discharge opening at its opposite end, said chute being curved arcuately upwardly from said one end and terminating in an upwardly presented charging opening, a packer element swingably mounted on said receptacle for movement into and from said chute about the axis of curvature of said chute, and actuating means for said packer element comprising an arm element swingable about said axis in angularly spaced relation to said packer element, a double-acting hydraulic cylinder and piston unit operatively interconnecting said elements for relative swinging movement, and a double acting hydraulic unit operatively interconnecting said arm element to the receptacle.

10. The combination of claim 9, wherein said first-mentioned cylinder and piston unit is movable through said charging opening with the packer element.

11. In combination with an arcuate chute having a charging opening at one arcuate end thereof, and a packer element swingably mounted about the axis of curvature of said chute for movement through said opening and along said chute, actuating means for said packer element comprising an arm element swingable about said axis, a fluid pressure actuated cylinder and piston unit operatively interconnecting said elements for relative swinging movement, and a similar unit interconnected between said arm element and an anchorage point fixed relatively to said chute.

12. In combination with a motor truck having a tilting type dump body, including a rear end gate, and power means for tilting said body upwardly to dumping position about its rear end, a packer element movable in said body toward the rear end thereof to compress the contents of said body against its said end gate, and means for actuating said element in the dumping position of the body to initiate the rearward discharge movement of the said contents, said body including an arcuate infeed chute communicating circumferentially with the forward end of said body, said packer element being mounted on said body for swinging movement about the axis of curvature of said chute, and said actuating means includes a fluid pressure actuated unit interconnected between said body and the packer element.

13. Material charging and compressing mechanism for a vehicle body having a rear end gate and formed with an upwardly directed charging opening adjacent its forward end comprising, an infeed chute having an arcuate bottom curved downwardly and rearwardly from the forward edge of said charging opening about an axis of curvature adjacent the rear edge of said opening, a packer element mounted for swinging movement along the chute about said axis, in combination with means for delivering material toward the said charging opening at a rearward and downward angle, means being provided for maintaining said packer element in an upwardly swung position about its said axis adjacent the rear edge of said charging opening to direct such material into the charging opening, and means for swinging said packer element downwardly and rearwardly into said chute to urge the material therethrough toward said rear end gate.

14. The combination of claim 13 wherein said means for maintaining the packer element in an upwardly swung position, and said means for swinging said packer element, both comprise a common hydraulic actuating mechanism interconnected between said packer element and said vehicle body.

15. The combination of claim 12, including means for positioning said packer element as a stationary closure in said chute.

References Cited in the file of this patent

UNITED STATES PATENTS

| | | |
|---|---|---|
| 1,985,169 | Howell et al. | Dec. 18, 1934 |
| 2,050,806 | Rey | Aug. 11, 1936 |
| 2,441,591 | Owen | May 18, 1948 |
| 2,511,556 | Wood | June 13, 1950 |
| 2,750,055 | Huffines | June 12, 1956 |
| 2,784,853 | Bowles | Mar. 12, 1957 |
| 2,793,769 | Weber | May 28, 1957 |

FOREIGN PATENTS

| | | |
|---|---|---|
| 1,064,242 | France | Dec. 23, 1953 |